(12) United States Patent
Kidwell

(10) Patent No.: US 10,035,106 B2
(45) Date of Patent: Jul. 31, 2018

(54) MEMBRANE FILTRATION USING LOW ENERGY FEED SPACER

(71) Applicant: Conwed Plastics LLC, Minneapolis, MN (US)

(72) Inventor: Alexander James Kidwell, Minneapolis, MN (US)

(73) Assignee: Conwed Plastics LLC, Minneapolis, MN (US)

( * ) Notice: Subject to any disclaimer, the term of this patent is extended or adjusted under 35 U.S.C. 154(b) by 0 days.

(21) Appl. No.: 13/919,290

(22) Filed: Jun. 17, 2013

(65) Prior Publication Data

US 2013/0341264 A1    Dec. 26, 2013

Related U.S. Application Data

(60) Provisional application No. 61/690,419, filed on Jun. 26, 2012.

(51) Int. Cl.
*B01D 63/10* (2006.01)
*B33Y 80/00* (2015.01)
(Continued)

(52) U.S. Cl.
CPC ........... *B01D 63/103* (2013.01); *B01D 63/10* (2013.01); *B29C 47/0014* (2013.01);
(Continued)

(58) Field of Classification Search
CPC ............................................... B01D 2313/143
(Continued)

(56) References Cited

U.S. PATENT DOCUMENTS 4,213,858 A * 7/1980 Boberg et al. ................ 210/649
4,710,185 A   12/1987 Sneyd, Jr. et al.
(Continued)

FOREIGN PATENT DOCUMENTS

CN    2774624    4/2006
GB    2180162    3/1987
(Continued)

OTHER PUBLICATIONS

Nomura et al., Machine Translation of JPH0938410, 1997, 16 total pages.*

(Continued)

*Primary Examiner* — Bobby Ramdhanie
*Assistant Examiner* — Jonathan Peo
(74) *Attorney, Agent, or Firm* — Pauly, DeVries, Smith & Deffner LLC

(57) ABSTRACT

In at least one embodiment, a membrane filtration element is provided. The element may include at least one feed spacer including a first set of parallel strands extending in a first direction and including a plurality of first strands having a first thickness and a plurality of second strands having a second thickness that is smaller than the first thickness. A second set of parallel strands may extend in a second direction that is transverse to the first direction. The second set of parallel strands may include a plurality of third strands having a third thickness and a plurality of fourth strands having a fourth thickness that is smaller than the third thickness. In one embodiment, the first and second sets of strands include alternating thick and thin strands, which reduce pressure drop in membrane filtration systems.

28 Claims, 3 Drawing Sheets

(51) Int. Cl.
  *B29C 47/00* (2006.01)
  *B29L 28/00* (2006.01)
  *B29L 31/14* (2006.01)
  *B29K 23/00* (2006.01)
  *B29C 47/30* (2006.01)

(52) U.S. Cl.
  CPC .......... *B33Y 80/00* (2014.12); *B01D 2313/14* (2013.01); *B01D 2313/143* (2013.01); *B29C 47/30* (2013.01); *B29K 2023/0683* (2013.01); *B29L 2028/00* (2013.01); *B29L 2031/14* (2013.01)

(58) Field of Classification Search
  USPC ........................................ 210/321.74, 321.83
  See application file for complete search history.

(56) References Cited

U.S. PATENT DOCUMENTS

| | | | | |
|---|---|---|---|---|
| 4,778,601 | A | * | 10/1988 | Lopatin et al. .......... 210/500.27 |
| 5,069,793 | A | | 12/1991 | Kaschemekat et al. |
| 5,096,584 | A | | 3/1992 | Reddy et al. |
| 5,180,409 | A | | 1/1993 | Fischer |
| 5,236,665 | A | * | 8/1993 | Mathewson et al. .......... 422/46 |
| 6,068,771 | A | | 5/2000 | McDermott et al. |
| 6,656,362 | B1 | | 12/2003 | Kihara et al. |
| 6,881,336 | B2 | | 4/2005 | Johnson |
| 7,459,082 | B2 | | 12/2008 | Tung et al. |
| 2003/0205520 | A1 | * | 11/2003 | Johnson .................. 210/321.85 |
| 2004/0182774 | A1 | | 9/2004 | Hirokawa et al. |
| 2004/0182775 | A1 | | 9/2004 | Hirokawa et al. |
| 2007/0175812 | A1 | | 8/2007 | Chikura et al. |
| 2008/0017578 | A1 | | 1/2008 | Childs et al. |
| 2008/0182149 | A1 | | 7/2008 | Zhang et al. |
| 2010/0096316 | A1 | | 4/2010 | Chikura et al. |
| 2010/0326910 | A1 | | 12/2010 | van der Padt et al. |
| 2011/0168623 | A1 | | 7/2011 | Uda et al. |

FOREIGN PATENT DOCUMENTS

| | | |
|---|---|---|
| JP | 09038410 | 2/1997 |
| JP | 2000237554 | 9/2000 |
| JP | 2005305422 | 11/2005 |

OTHER PUBLICATIONS

PCT International Search Report and Written Opinion of the International Searching Authority dated Nov. 14, 2013, Application No. PCT/US2013/046101, Applicant Conwed Plastics LLC, 7 Pages.
J.S. Vrouwenvelder et al., "Biofouling in spiral wound membrane systems: Three-dimensional CFD model based evaluation of experimental data" Elsevier Journal of Membrane Science 346 (2010), pp. 71-85.
Communication Pursuant to Rules 161 and 162 EPC for European Patent Application No. 13810474, dated Mar. 10, 2015 (3 pages).
First Office Action for Chinese Patent Application No. 201380034171.X, dated Dec. 1, 2015 (22 pages) with translation.
Response to Communication Pursuant to Rules 161 and 162 EPC for European Patent Application No. 13810474, filed with the EPO Sep. 21, 2015 (9 pages).
Extended European Search Report for European Patent Application No. 13810474.0 dated Mar. 3, 2016 (11 pages).
Response to Communication pursuant to Rules 70(2) and 70a(2) EPC for European Patent Application No. 13810474.0 filed with the EPO Sep. 28, 2016 (10 pages).
Second Office Action for Chinese Patent Application No. 201380034171.X, dated Oct. 26, 2016 (21 pages) with English translation.
Office Action for Japanese Patent Application No. 2015-520275 dated Mar. 28, 2017 (7 pages) with English translation.

* cited by examiner

MEMBRANE FILTRATION USING LOW ENERGY FEED SPACER

CROSS-REFERENCE TO RELATED APPLICATIONS

This application claims the benefit of U.S. provisional Application No. 61/690,419 filed Jun. 26, 2012, the disclosure of which is incorporated in its entirety by reference herein.

TECHNICAL FIELD

The present invention relates to an extruded net for use in membrane filtration such as reverse osmosis systems.

BACKGROUND

Membrane filtration is a process used to separate a feed, or inlet, liquid into a product stream and a concentrate stream. Typically, the feed stream is water that needs to be filtered or desalinated so that it can be used for drinking, agricultural and industrial applications. In membrane filtration, a membrane acts as a barrier to allow certain compounds to pass through while rejecting others. One type of membrane filtration is reverse osmosis (RO) filtration, which is a pressure-driven process. During osmosis, water will diffuse from an area of high solute concentration to an area of low concentration due to osmotic pressure until an osmotic equilibrium is reached. Reverse osmosis is a process in which pressure is applied to a volume of high solute concentration in order to overcome the osmotic pressure and force the water in the high solute concentration to diffuse through the membrane to a low solute volume, thus leaving behind the solute. The membranes used in RO filtration are very selective and allow almost no solute to pass through.

One type of RO filtration system is known as a spiral wound element system. In this system, one or more membrane envelopes are wrapped around an elongate collection tube. Each membrane envelope comprises two membrane outer surfaces and a permeate sheet therebetween that communicates with holes in the sidewall of the collection tube. A feed spacer is disposed on one side of each membrane envelope such that when the membrane envelope is wrapped around the collection tube, a spiral configuration is formed with alternating layers of membrane envelope and feed spacer. The collection tube, membrane envelope(s), and feed spacer(s) combine to form a spiral wound element. Multiple elements are typically combined in series and parallel to process higher volumes of feed liquid.

In use, the spiral wound element is placed in a pressure vessel and water containing a high concentration of solute (known as feed water) is pumped, under pressure, into one end of the pressure vessel. The feed water enters the spiral wound membrane through the channels between the membrane envelopes created by the feed spacers and travels parallel to the axis of the collection tube. A portion of the feed water diffuses through the membrane and into the permeate sheet due to the high pressure of the feed water exceeding the osmotic pressure. The permeate sheet guides the water in a spiral direction until it reaches the collection tube and subsequently travels axially to the end of the spiral wound element. Feed water that does not diffuse through the membrane continues to travel in the axial direction and is typically transferred to another spiral wound element connected in series with the first spiral wound element.

SUMMARY

In at least one embodiment, a spiral wound filtration element is provided comprising a central collection tube having at least one hole defined therein, at least one membrane envelope attached to the central collection tube and having two membrane sheets separated by a spacer, the at least one membrane envelope configured to be wrapped around the central collection tube to form a spiral, and at least one feed spacer configured to be disposed adjacent to at least one membrane sheet when wrapped around the central collection tube and to create a channel to receive liquid to be filtered. The feed spacer may comprise a netting including a first set of parallel strands extending in a first direction and including a plurality of first strands having a first thickness and a plurality of second strands having a second thickness that is smaller than the first thickness, and a second set of parallel strands extending in a second direction that is transverse to the first direction. The first set of strands and the second set of strands may always be located on the same side of each other.

In at least one embodiment, an extruded netting is provided comprising a first set of parallel strands extending in a first direction and including a plurality of first strands having a first thickness and a plurality of second strands having a second thickness that is smaller than the first thickness, and a second set of parallel strands extending in a second direction that is transverse to the first direction and including a plurality of third strands having a third thickness and a plurality of fourth strands having a fourth thickness that is smaller than the third thickness. The first set of strands and the second set of strands may always be located on the same side of each other and the first set of parallel strands may comprise alternating first and second strands and the second set of parallel strands may comprise alternating third and fourth strands.

In at least one embodiment, a spiral wound filtration element is provided comprising a central collection tube having at least one hole defined therein, at least one membrane envelope attached to the central collection tube and having two membrane sheets separated by a spacer, the at least one membrane envelope configured to be wrapped around the central collection tube to form a spiral, and at least one feed spacer disposed adjacent to at least one membrane sheet when wrapped around the central collection tube and to create a channel to receive liquid to be filtered. The feed spacer may comprise a netting including a first set of parallel strands extending in a first direction and including a plurality of first strands having a first thickness and a plurality of second strands having a second thickness that is smaller than the first thickness, and a second set of parallel strands extending in a second direction that is transverse to the first direction and including a plurality of third strands having a third thickness and a plurality of fourth strands having a fourth thickness that is smaller than the third thickness. The first set of strands and the second set of strands may always be located on the same side of each other.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

Figure 1:
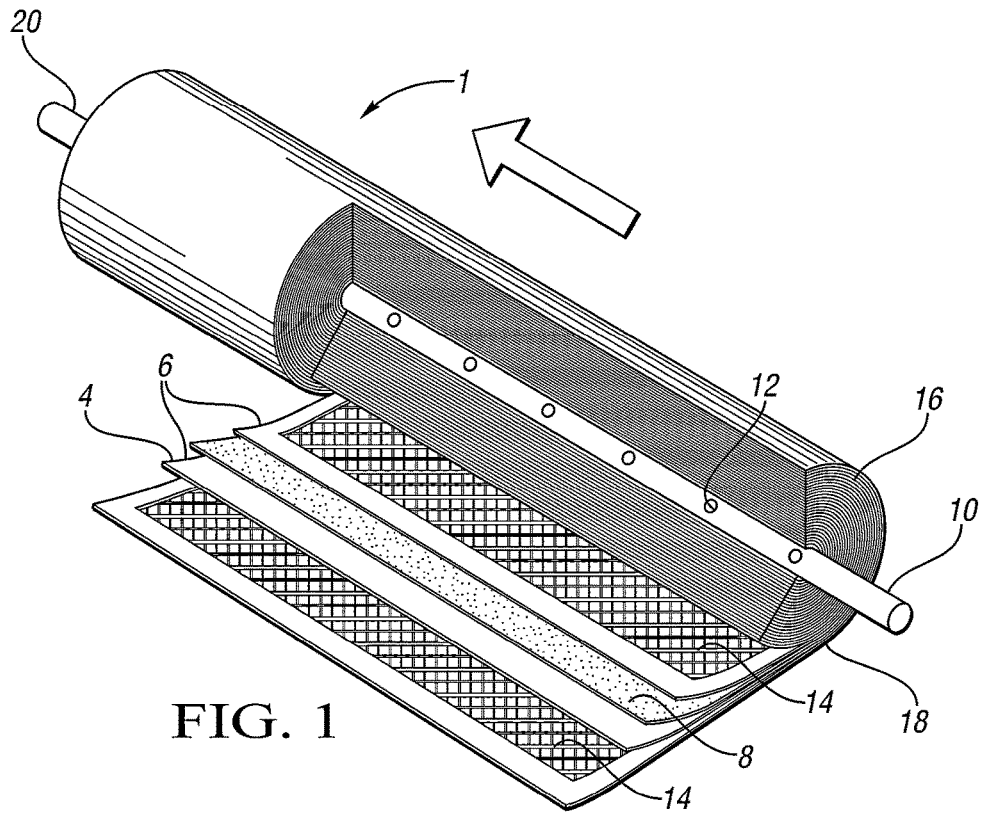
FIG. 1 is a cut-away view of a reverse osmosis spiral wound element according to at least one embodiment.

With reference to FIG. 1, a reverse osmosis (RO) system spiral wound element 1 is shown. While a RO system is illustrated, the same general configuration is applicable to membrane filtration systems in general. The spiral wound element (the element) 1 is typically configured to be placed in a pressure vessel 2 (not shown). The element 1 comprises at least one membrane envelope 4, which includes two membrane sheets 6 encapsulating a spacer, generally a permeate sheet 8. The permeate sheet 8 is in attached along one side to a collection tube 10 having holes 12 spaced in an axial direction. A feed spacer 14 is provided between each membrane envelope 4 such that at least one membrane sheet 6 in each membrane envelope 4 is in contact with a feed spacer 14. The spiral wound element 1 is formed when the membrane envelope(s) 4 and the feed spacer(s) 14 are rolled into a spiral with the collection tube 10 at the axial center. The feed spacers 14 create channels 16 between adjacent membrane sheets 6, allowing feed liquid to pass along the surface of the membrane sheets 6.

When the element 1 is placed in a pressure vessel, feed liquid is provided under pressure at a feed liquid inlet end 18 and the liquid enters the channels 16 formed by the feed spacer 14. The feed liquid travels in an axial direction parallel to the collection tube 10. As it travels across the surface of the membrane sheets 6, some of the liquid diffuses under pressure through the membrane sheets 6 and into the permeate sheet 8. This liquid, which contains little or no solute compared to the feed liquid, then travels in a spiral path through the permeate sheet 8 and through the holes 12 in the collection tube 10. The liquid traveling through the collection tube 10 is generally referred to as the permeate or the product liquid. Feed liquid that does not diffuse through the membrane sheets 6 continues to travel in the axial direction until it reaches an outlet end 20 of the element 1. At the outlet end 20 of the element 1, the product liquid is removed and the remaining feed liquid is generally transferred to another spiral wound element 1 to repeat the process to increase the yield of product liquid.

Several challenges exist with membrane filtration in general, and particularly for RO filtration. One challenge is pressure drop along the longitudinal length of the spiral wound element and from one filtration element to the next when connected in series. The feed spacer is a major source of the pressure drop because it resists the flow of the feed liquid through the spiral wound element. As a result, the feed pressure must be increased in the RO filtration system, which increases operation and maintenance costs. A second challenge is fouling, particularly biofouling. Fouling occurs when deposits build up or grow on the membranes, which can require increasing the feed pressure, and can damage or reduce the lifespan of the membranes. Biofouling occurs when the deposits are biological in nature, such as bacteria, fungi, protozoa, and others. These microorganisms may be deposited and/or may grow on the membrane, reducing efficiency and requiring cleaning A third challenge is concentration polarization, in which there is an increase of salt concentration at or near the membrane surface. This increases the osmotic pressure at the surface of the membrane and can lead to reduced liquid transmission and increased solute transmission. The feed spacer plays a role in addressing and/or mitigating these concerns.

Figure 2:
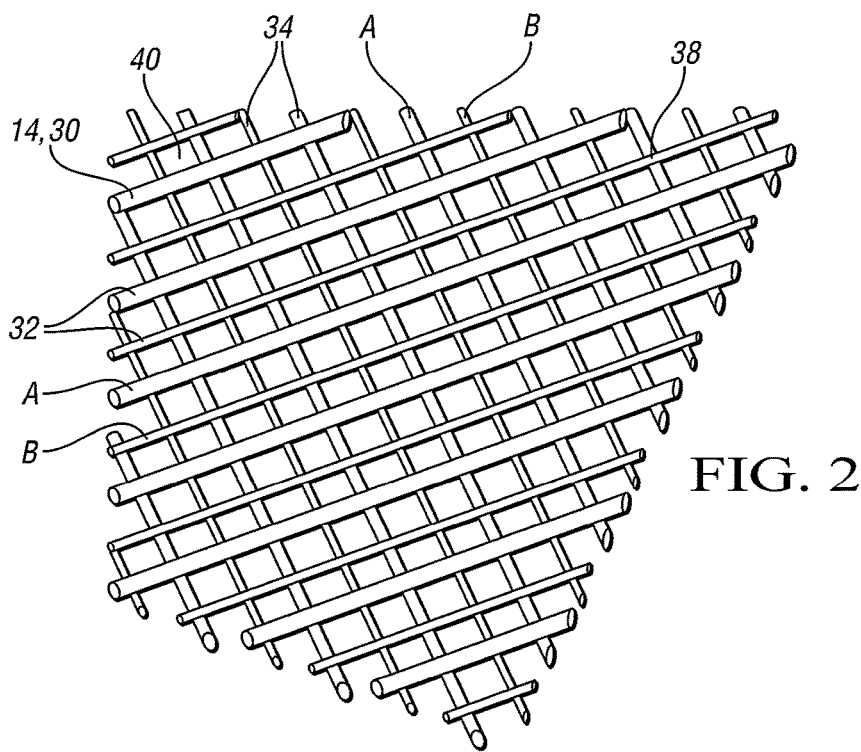
FIG. 2 is a perspective view of a netting according to at least one embodiment.
Figure 3:
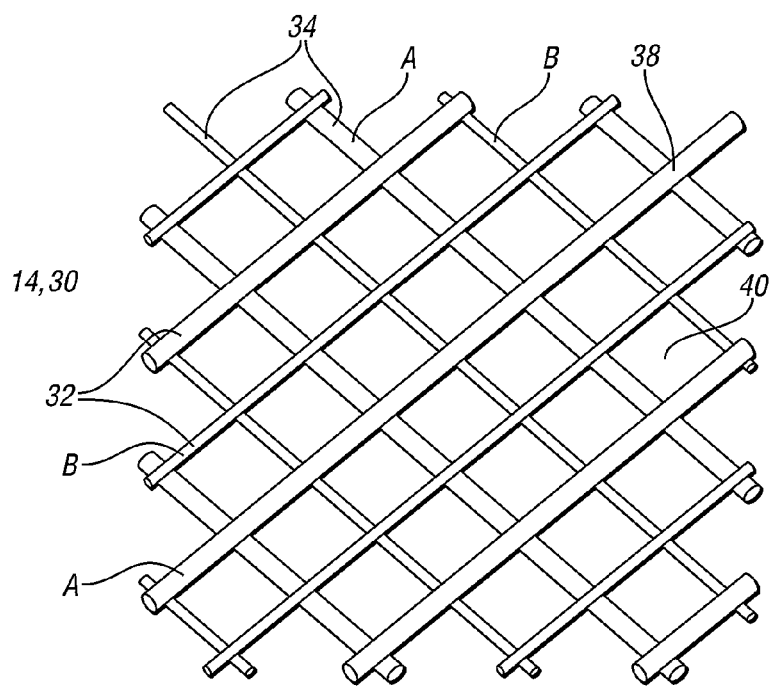
FIG. 3 is a top view of a netting according to at least one embodiment.
Figure 4:
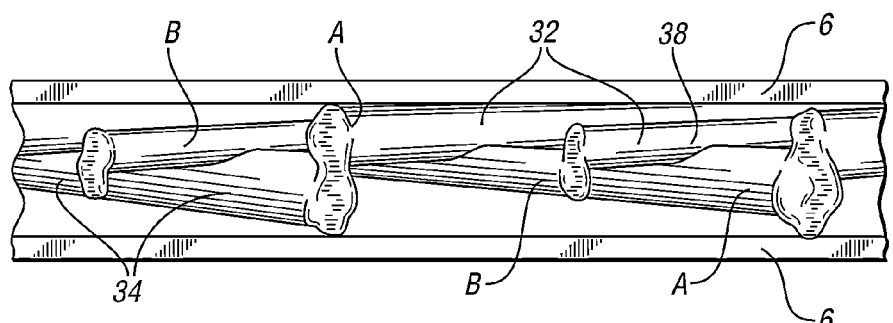
FIG. 4 is a cross section of a netting between adjacent membrane sheets according to at least one embodiment.

With reference to FIGS. 2-4, the present disclosure provides a feed spacer 14 that provides relatively high RO filtration throughput while addressing issues such as pressure drop, biofouling, and concentration polarization. In at least one embodiment, the feed spacer 14 of the present disclosure is formed as an extruded netting 30 comprising a first set of strands 32 and a second set of strands 34. In at least one embodiment, the strands of the first set of strands 32 are disposed parallel to each other and extend in a first direction and the strands of the second set of strands 34 are disposed parallel to each other and extend in a second direction generally transverse to the first direction. In at least one embodiment, the first direction and second direction are substantially perpendicular such that the first strands 32 and second strands 34 intersect at right angles (90°).

However, it should be understood that the first strands 32 and second strands 34 may intersect at angles other than 90°. In one embodiment, the first strands 32 and second strands 34 intersect at angles from 60 to 120 degrees in a direction parallel to a longitudinal axis of the element. In another embodiment, the first strands 32 and second strands 34 intersect at angles from 65 to 110 degrees in a direction parallel to a longitudinal axis of the element. In another embodiment, the first strands 32 and second strands 34 intersect at angles from 70 to 100 degrees in a direction parallel to a longitudinal axis of the element. In another embodiment, the first strands 32 and second strands 34 intersect at angles from 75 to 90 degrees in a direction parallel to a longitudinal axis of the element.

In at least one embodiment, the strands 32 and 34 are extruded polymeric elongate members which cross and intersect upon or shortly after exiting the extrusion die(s) to form the netlike structure. In this embodiment, strands 32 and 34 stay on the same side of each other throughout the net 30. However, the strands 32 and 34 could also be formed of extruded strands that are knitted or woven together rather than crossing during extrusion. The strands 32 and 34 can be made of any suitable material, such polyolefins, polystyrenes, polyesters, polyamides, acetals, floropolymers, polyurethanes and elastomers. In at least one embodiment, the strands 32 and/or 34 are made of polypropylene. In another embodiment, the strands 32 and/or 34 are made of polyethylene, such as low density polyethylene (LDPE), high density polyethylene (HDPE), or ultra-high molecular weight polyethylene (UHMWPE). In at least one embodiment, the strands 32 and 34 are made of the same material. In other embodiments however, it is contemplated that the strands 32 could be made of different materials than strands 34.

As exemplary shown in FIGS. 2-4, in at least some embodiments both sets of strands 32 and 34 comprise at least two different sized stands. Each set of strands 32 and 34 comprise large strands identified as A and smaller strands identified as B. Accordingly, the first set of strands 32 has a plurality of first strands with a first thickness (A strands) and a plurality of second strands with a second thickness (B strands) and the second set of strands 34 has a plurality of third strands with a third thickness (A strands) and a plurality of fourth strands with a fourth thickness (B strands). The strands A and B can independently be any suitable size as long as A is appreciably bigger than B.

It is presently believed that a feed spacer 14 with both sets of strands 32, 34 having alternating A and B strands is the most effective configuration for RO spiral wound elements because such a configuration provides a decrease in pressure drop while still maintaining sufficient support point density with the membrane sheets 6 to maintain the integrity of the channels 16. In addition, when both sets of strands 32, 34 have alternating A and B strands, the flow across the feed spacer 14 is substantially symmetrical in the channels 16 and exposes each membrane sheet 6 to similar conditions. However, in some embodiments, one set of strands 32 or strands 34 may have strands with a uniform thickness, for example only A strands or only B strands, while the other set of strands 32 or strands 34 has both A strands and B strands, as described above. In still other embodiments, either one or both of the strands 32 and strands 34 may include strands having a third thickness, or C strands that differ from the A and B strands.

In one embodiment, strands A have a thickness of 5 to 40 thousandths of an inch, or mils (0.127 to 1.016 mm). In another embodiment, strands A have a thickness of 8 to 35 mils (0.203 to 0.889 mm). In another embodiment, strands A have a thickness of 10 to 30 mils (0.254 to 0.762 mm). In another embodiment, strands A have a thickness of 15 to 25 mils (0.381 to 0.635 mm). In yet another embodiment, strands A have a thickness of 20 mils (0.508 mm). In one embodiment, strands B have a thickness of 3 to 35 mils (0.076 to 0.889 mm). In another embodiment, strands B have a thickness of 3 to 25 mils (0.076 to 0.635 mm). In another embodiment, strands B have a thickness of 3 to 20 mils (0.076 to 0.508 mm). In another embodiment, strands B have a thickness of 5 to 15 mils (0.127 to 0.381 mm). In another embodiment, strands B have a thickness of 7 to 12 mils (0.178 to 0.305 mm). In yet another embodiment, strands B have a thickness of 10 mils (0.254 mm). In at least one embodiment, the A strands and B strands in strands 32 have the same thickness as the A strands and B strands in strands 34. In another embodiment, the A strands of strands 32 and 34 have the same thickness and the B strands have different thicknesses. In another embodiment, the B strands of strands 32 and 34 have the same thickness and the A strands have different thicknesses. In yet another embodiment, the A strands and B strands of strands 32 and 34 both have different thicknesses.

In at least one embodiment, the strands 32 and 34 (A and B) have a circular cross section. However, it is contemplated that any suitable shape can be utilized. When the strands have a circular cross section, the thickness is measured by measuring the diameter of the strands 32 and 34. In some embodiments in which strands 32 and 34 have a circular cross section, the thickness of the strands 32 and 34 remain substantially constant throughout their length. In other embodiments, however, the strands 32 and 34 may have reduced thickness portions that are between intersection points 38.

Figure 5:
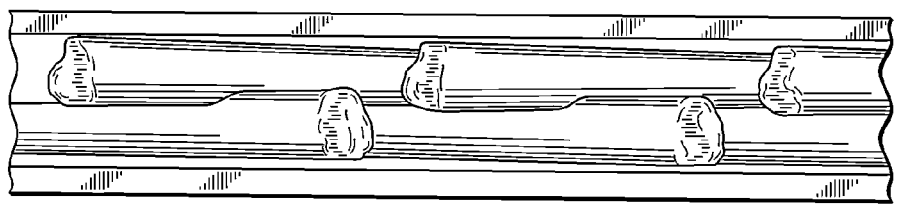
FIG. 5 is a cross section of a prior art netting between adjacent membrane sheets.
Figure 6:
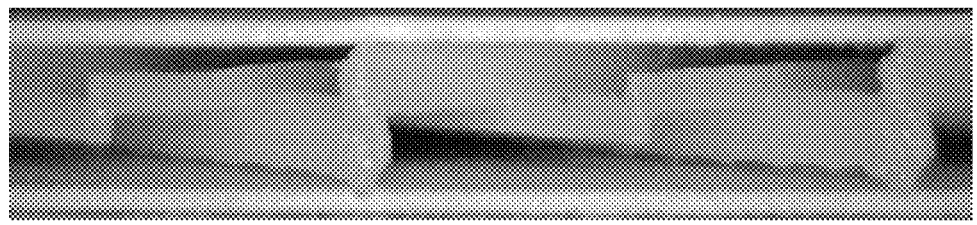
FIG. 6 is a photograph of a cross section of a netting between adjacent membrane sheets according to at least one embodiment.

As can best be seen in FIG. 4, the thickness of the netting 30 is not uniform as there are three different types of intersections of the strands 32 and 34: A/A, A/B, and B/B. For comparison, a typical prior art feed spacer having uniform strand thickness and uniform total thickness is shown in FIG. 5. An example of a netting 30 including A strands having a thickness of 22 mils and B strands having a thickness of 12 mils is shown in cross section between two membrane sheets in FIG. 6. When two A strands intersect, the thickness of the net 30 is at its maximum and when two B strands intersect, the thickness of the net 30 is at its minimum. As used herein, the overall thickness of the net 30 refers to intersections 38 of two A strands, or the maximum thickness of the net 30. In addition, the thickness of the net 30 may not always correspond to twice the thickness of the A strands. As shown in FIG. 4, the two strands may partially merge at the intersection points 38, or "sink in" to each other. The amount of merging of strands 32 and 34 may vary based on processing parameters. In one embodiment, it may be from 0.1 to 30%. In another embodiment the amount of merging may be from 5 to 20%. In another embodiment, the amount of merging may be from 10 to 15%. For example, at the intersection 38 of two A strands, each having a diameter of 20 mils (0.508 mm), the thickness of the net 30 may be 34 mils (0.864 mm) instead of 40 mils (1.016 mm, twice the thickness of each strand). In this example, there would be merging of 15%.

In at least one embodiment, the net 30 has an overall thickness of 20 to 80 mils (0.508 to 2.032 mm), as measured at the intersection points 38. In another embodiment, the net 30 has an overall thickness of 22 to 65 mils (0.559 to 1.651 mm). In another embodiment, the net 30 has an overall thickness of 25 to 50 mils (0.635 to 1.270 mm). In another embodiment, the net 30 has an overall thickness of 28 to 45 mils (0.711 to 1.143 mm). In another embodiment, the net 30 has an overall thickness of 30 to 40 mils (0.762 to 1.016 mm).

In the embodiments shown in FIGS. 2-4, strands 32 and 34 each have alternating A and B strands, i.e. the strand sequence is ABAB. . . . It is presently believed that an alternating strand sequence is the most effective sequence for RO spiral wound elements 1 because it provides a more consistent and/or constant flow rate and provides the most effective balance between turbulence creation and supporting of the channels 16. However, other strand sequences are also contemplated in which multiple A strands are repeated between B strands, or vice versa (e.g. ABBABB or AABAAB). In addition, A and B strands may be arranged in blocks, for example AABB or AAABB. In the embodiments shown in FIGS. 2-4, strands 32 and 34 have the same strand sequence, however strands 32 and 34 may have different strand sequences, which may be any combination of the above.

The strands in sets of strands 32 and 34 may have a uniform spacing therebetween, which is the strand spacing. Strands 32 and 34 have the same strand spacing in the embodiments shown in FIGS. 2-4, however the strand spacing may be different for each set of strands. Strand spacing may be measured as the number of strands per inch. In at least one embodiment, the strand spacing is from 2 to 30 strands per inch. In another embodiment, the strand spacing is from 3 to 25 strands per inch. In another embodiment, the strand spacing is from 5 to 20 strands per inch. In another embodiment, the strand spacing is from 7 to 15 strands per inch. In yet another embodiment, the strand spacing is nine strands per inch. Furthermore, it should be understood that various sized openings 40 formed by the intersection of the strands 32 and 34 can be utilized. Moreover, while the holes or openings 40 are shown in the drawings to be square, it should be understood that any suitable shape and size could be utilized. For example, if strands 32 and 34 are perpendicular and one set of strands has a smaller strand spacing than the other, rectangular openings 40 may be formed. If strands 32 and 34 are not perpendicular, then the openings 40 may be in the shape of a rhombus.

The alternating thickness of strands 32 and 34, also called the alternating strand design, offers improvement over currently available feed spacers in areas such as pressure drop, biofouling, membrane damage, and concentration polarization, among others. The advantages discussed below refer to the filtration of salt water to obtain pure water or drinking water, however the same principles apply to the filtration of other feed liquids.

The alternating strand design (ASD) leads to a reduction in pressure drop compared to a conventional feed spacer having uniform strand thickness throughout. In one embodiment, the pressure drop in a membrane filtration element having an ASD feed spacer is at least 10% less than the same element having a conventional feed spacer (i.e, a feed spacer having strands of uniform thickness, as shown in FIG. 5). In another embodiment, the pressure drop in a membrane filtration element having an ASD feed spacer is at least 15% less than the same element having a conventional feed spacer. In another embodiment, the pressure drop in a membrane filtration element having an ASD feed spacer is at least 20% less than the same element having a conventional feed spacer. In another embodiment, the pressure drop in a membrane filtration element having an ASD feed spacer is at least 25% less than the same element having a conventional feed spacer. In another embodiment, the pressure drop in a membrane filtration element having an ASD feed spacer is at least 30% less than the same element having a conventional feed spacer. In another embodiment, the pressure drop in a membrane filtration element having an ASD feed spacer is at least 35% less than the same element having a conventional feed spacer.

Without being held to any particular theory, it is believed that the reduction in pressure drop is due, at least in part, to the reduced strand surface area of the B strands (compared to conventional feed spacers with all A strands). The reduced strand surface area leads to a reduction in form drag thus helping to reduce the resistance of the net 30 to the water flowing over it and across the surface of the membrane sheets 6. The reduction of overall net strand surface area compared to a conventional feed spacer netting (i.e. a netting with uniform strand thickness) varies based on the thickness of the A and B strands. In at least one embodiment, the overall net strand surface area is reduced by at least 10%. In another embodiment, the overall net strand surface area is reduced by at least 25%.

Another result of the ASD is a reduction in flow velocity of the salt water, or other liquid, compared to conventional feed spacers at the same feed rate. A reduced flow velocity translates to reduced shear stress at the membrane surface and reduced turbulence in the salt water. Since shear stress and turbulence are beneficial in addressing problems such as biofouling and concentration polarization (discussed below), it is advantageous to increase the feed rate to bring the flow velocity, shear stress, and turbulence back up to typical levels (i.e. those achieved with a typical, uniform strand thickness feed spacer). However, the increase in the feed rate when the ASD feed spacer 14 is used does not increase the pressure drop to a level higher than in the typical spiral wound element. To the contrary, the pressure drop may remain lower than in the typical element. As a result, a RO filtration system may be operated at a higher feed rate than a typical system, but with the same or lower pressure drop and the same or better shear stress and turbulence. Alternatively, the filtration system may be operated at the same feed rate as a typical system but with a reduced pressure drop. Either method of operation may therefore result in lower energy consumption.

Biofouling is the deposition and/or growth of microorganisms on the membrane surface, which can result in pressure drop increases, reduced diffusion of water through the membrane, and an increase in the amount of salt that passes through the membrane. Biofouling is increased in areas where the feed spacer contacts the membrane. The ASD leads to a reduction in contact area between the feed spacer 14 and the membrane sheets 6, and therefore a reduction in biofouling, because the B strands of strands 32 and 34 do not contact the membrane sheets 6. Typical nets 30 have uniform thickness throughout; therefore every intersection point 38 contacts both adjacent membrane sheets 6. In elements 1 having nets 30 with an ASD, most intersection points 38 contact only one or neither adjacent membrane sheets 6. As shown in FIG. 4, intersections 38 of BB strands contact neither of adjacent membrane sheets 6 and intersections 38 of AB strands contact only one adjacent membrane sheet 6. In addition to reduced contact area with the membranes 6, the feed spacer 14 with ASD results in lower water velocity in areas where strands are thinner. High water velocity is associated with more biofouling growth because more nutrients are brought to areas of high water velocity. The lower water velocity of the ASD feed spacer 14 therefore means that there are less organic nutrients in the areas of the B strands, which reduces biofouling in those areas.

To further reduce biofouling build up, strands 32 and 34 may be coated with a low COF coating or may have a low COF additive included in their composition. In one embodiment, the low COF additive is UHMWPE (generally having a molecular weight of 1 to 6 million Da). In another embodiment, the low COF additive is polytetrafluoroethylene (PTFE, also known as Teflon). The low COF additive, if present, may comprise 0.1 to 10% by weight of the feed spacer 14. In another embodiment, the low COF additive may comprise 1 to 7.5% by weight of the feed spacer 14. In another embodiment, the low COF additive may comprise about 5% by weight of the feed spacer 14. The low COF additive may include active and inactive components. In one embodiment, the low COF additive includes 0.1 to 75% by weight of active components. In another embodiment, the low COF additive includes 1 to 50% by weight of active components. In another embodiment, the low COF additive includes 10 to 40% by weight of active components. In another embodiment, the low COF additive includes about 25% by weight of active components. The balance of the low COF additive may be an inactive carrier, such as a carrier resin. The carrier resin may be a polyolefin, for example LDPE, HDPE, or polypropylene (PP).

Decreasing biofouling may reduce the number of membrane cleaning cycles needed per year for a membrane filtration element. The chemicals used for cleaning the membranes may cause membrane damage, therefore reduced biofouling may also reduce membrane damage. In addition to reducing biofouling, the reduced contact area between the feed spacer 14 with ASD and the membrane sheets 6 also reduces membrane damage. Fewer intersections 38 contacting the membrane sheets 6 results in less scratching and rubbing occurring between the feed spacer 14 and the membrane sheets 6.

In addition, due to the reduced pressure drop from use of the ASD feed spacer 14; the feed spacer 14 may be made thinner than conventional feed spacers for an otherwise similar element 1. If a conventional feed spacer were made thinner to have the same thickness as the ASD feed spacer 14, then there may be unacceptable pressure drop in the element 1. Having a thinner feed spacer 14 allows for more membrane envelopes 4 to be wrapped around the collection tube 10, thereby increasing the amount of membrane sheet 6 surface area within the element 1, which typically have a maximum diameter of about 16 inches.

EXAMPLE 1

Two brackish water reverse osmosis (BWRO) filtration systems were wound using ASD feed spacers and compared to two BWRO filtration systems using conventional feed spacers having uniform thicknesses. The filtration elements were 8 inches in diameter and 40 inches long and were tested in parallel under the conditions shown below in Table 1 for one hour. Both the ASD and conventional feed spacers had a thickness of 34 mils (~0.86 mm) and had 25 membrane sheets and 12 feed spacers. The results of the test are shown below in Table 2. The rejection rates (e.g., the percent of solute prevented from passing through the membrane sheets) for the ASD and conventional feed spacers were similar. The elements having the ASD feed spacer had slightly higher flow rates on a $m^3$ per day basis. The pressure drop ($\Delta P$) of the elements having the ASD spacer showed an average reduction of about 23.3% compared to the elements having a traditional spacer.

TABLE 1

Testing conditions for filtration systems having ASD and conventional feed spacers.

| | |
|---|---|
| Conductivity (μS/cm) | 3,200 |
| pH | 7 |
| Feed Pressure (bar) | 15.5 |
| Concentrate Flow (m³/h) | 4.8 |
| Temperature (° C.) | 25 |

TABLE 2

Test results for filtration systems having ASD and conventional feed spacers.

| Sample | Rejection (%) | Flow (m³/day) | ΔP (bar) | ΔP Improvement (%) |
|---|---|---|---|---|
| Conventional 1 | 99.6 | 43.7 | 0.15 | N/A |
| ASD 1 | 99.7 | 44.5 | 0.11 | 26.7 |
| Conventional 2 | 99.5 | 42.5 | 0.15 | N/A |
| ASD 2 | 99.6 | 44.4 | 0.12 | 20.0 |

EXAMPLE 2

A conventional diamond feed spacer having an overall thickness of 75 mils and an ASD feed spacer having an overall thickness of 75 mils were fabricated using 3D printing. The conventional feed spacer had a uniform strand thickness of 37.5 mils. The ASD feed spacer had large (A) strands with a thickness of 37.5 mils and small (B) strands of 18.75 mils (e.g., the B strands had a thickness equal to one-half of the A strand thickness). The feed spacers were tested using a Sterlitech SEPA CF Membrane Element Cell ("the flow cell"). The conventional spacer and the ASD spacer were tested at flow rates of 2.0 and 1.0 gallons per minute. The results showed that for a 2.0 gallon/minute flow rate, the ASD spacer had a 16.79% reduction in pressure drop compared to the conventional spacer. For a 1.0 gallon/minute flow rate, the ASD spacer had a 30.05% reduction in pressure drop compared to the conventional spacer. The results are shown below in Table 3.

TABLE 3

Pressure drop results in a flow cell for an embodiment of an ASD feed spacer compared to a conventional spacer.

| Sample Description | Pressure Inlet PSI | Pressure Outlet PSI | Pressure Delta PSI | Improvement % vs Control | Flow Rate Gal/min |
|---|---|---|---|---|---|
| Diamond control - 75 mil | 88.71 | 82.1 | 6.61 | N/A | 2.0 |
| Diamond control - 75 mil | 98.34 | 96.41 | 1.93 | N/A | 1.0 |
| ASD - 75 mil | 88.66 | 83.16 | 5.50 | 16.79 | 2.0 |
| ASD - 75 mil | 98.27 | 96.92 | 1.35 | 30.05 | 1.0 |

EXAMPLE 3

Simulated tests using computational fluid dynamics (CFD) were run using the Navier-Stokes equations for laminar flow of a Newtonian incompressible liquid. Two conditions were tested: constant inlet flow velocity and constant feed flow rate (conditions shown in Table 4, results in Table 5). The results of the simulation showed that for a constant inlet flow velocity of 0.16 m/s, pressure drop was reduced by 27% in the ASD feed spacer, compared to the conventional spacer. For a constant feed flow rate of 16 L/h, the simulation results showed that pressure drop was reduced by 32% in the ASD feed spacer, compared to the conventional spacer. When inlet flow velocity was held constant at 0.16 m/s, the ASD feed spacer had a 5.9% greater feed flow rate compared to the conventional spacer. When the feed flow rate was held constant at 16 L/h, the ASD feed spacer had a 5.6% lower inlet flow velocity compared to the conventional spacer.

TABLE 4

CFD conditions for constant inlet flow velocity
and constant feed flow rate simulations.

| Feed spacer | Thickness | Porosity | Feed flow rate (L/h) | Inlet flow velocity (m/s) |
|---|---|---|---|---|
| Conventional | 863 μm | 0.85 | Varying (F = 16.9) | Constant (u_in = 0.16) |
| ASD | 863 μm | 0.90 | Varying (F = 17.9) | Constant (u_in = 0.16) |
| Conventional | 863 μm | 0.85 | Constant (F = 16) | Varying (u_in = 0.151) |
| ASD | 863 μm | 0.90 | Constant (F = 16) | Varying (u_in = 0.143) |

TABLE 5

CFD simulation results for constant inlet flow velocity
and constant feed flow rate simulations.

| Spacer configuration | Average pressure inlet (Pa) | Average pressure outlet (Pa) | Pressure drop (Pa) | Pressure drop per cm (kPa/cm) |
|---|---|---|---|---|
| Constant inlet velocity (u_in = 0.16 m/s) | | | | |
| Standard | 195 | 28 | 167 | 0.233 |
| Modified | 122 | 0 | 122 | 0.171 (27% reduction) |
| Constant inlet flow rate (F = 16 L/h) | | | | |
| Standard | 178 | 26 | 152 | 0.211 |
| Modified | 103 | 0 | 103 | 0.143 (32% reduction) |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A spiral wound filtration element comprising:
a central collection tube having at least one hole defined therein;
at least one membrane envelope attached to the central collection tube and having two membrane sheets separated by a spacer, the at least one membrane envelope configured to be wrapped around the central collection tube to form a spiral; and
at least one feed spacer configured to be disposed adjacent to at least one of the two membrane sheets when wrapped around the central collection tube and to create a channel to receive liquid to be filtered, the at least one feed spacer configured to allow fluid flow through the membrane envelope, the at least one feed spacer comprising a netting including:
a first set of solid, parallel strands extending in a first direction and including a plurality of first strands having a first thickness, and a plurality of solid second strands having a second thickness that is smaller than the first thickness, the first and second strands spaced apart from one another with an open spacing to readily allow the fluid flow between the first and second strands; and
a second set of solid, parallel strands fused to the first and second strands, and extending in a second direction that is transverse to the first set of parallel strands, and including a plurality of third strands having a third thickness and a plurality of fourth strands having a fourth thickness that is smaller than the third thickness the third and fourth strands spaced apart from one another with an open spacing to readily allow the fluid flow between the third and fourth strands;
wherein the thickness of the at least one feed spacer is not uniform, such that the at least one feed spacer is thickest where the first and third strands intersect, thinnest where the second and fourth strands intersect, and having an intermediate thickness where the first and fourth strands intersect and an intermediate thickness where the third and second strands intersect that is the same as the intermediate thickness where the first and forth strands intersect;
wherein the first and third strands, the first and fourth strands, the second and fourth strands, and the third and second strands merge by 0.1 to 30 percent where each of the first and third strands, the first and fourth strands, the second and fourth strands, and the third and second strands intersect;
wherein the overall strand surface area is reduced by at least 10 percent relative to having strands of uniform thickness; and
wherein the at least one feed spacer make contact with the two membrane sheets at contact points, and the feed spacer has three thicknesses at the contact points: a first thickness and a second thickness greater than the first thickness, and wherein the number of contact points at the second thickness are substantially equal to the sum of contact points of the first thickness.

2. The spiral wound filtration element of claim 1, wherein the first set of parallel strands comprises alternating the first and second strands.

3. The spiral wound filtration element of claim 1, wherein the first set of parallel strands comprises alternating the first and second strands and the second set of parallel strands comprises alternating the third and fourth strands.

4. The spiral wound filtration element of claim 1, wherein the first strands and the third strands have thicknesses of 5 to 40 mils and the second strands and the fourth strands have thicknesses of 3 to 35 mils.

5. The spiral wound filtration element of claim 1, wherein the first strands and the third strands have thicknesses of 8 to 35 mils and the second strands and the fourth strands have thicknesses of 5 to 15 mils.

6. The spiral wound filtration element of claim 1, wherein the first strands and the third strands have thicknesses of 10 to 30 mils and the second strands and the fourth strands have thicknesses of 7 to 12 mils.

7. The spiral wound filtration element of claim 1, wherein the first strands and the third strands have the same thickness and the second strands and the fourth strands have the same thickness.

8. The spiral wound filtration element of claim 1, wherein the at least one feed spacer has a total thickness at an intersection of the first strands and the third strands of 25 to 50 mils.

9. The spiral wound filtration element of claim 1, wherein the first set of parallel strands is perpendicular to the second set of parallel strands.

10. The spiral wound filtration element of claim 1, wherein the first set of parallel strands intersects the second set of parallel strands at an angle of 65 to 110 degrees in a direction parallel to a longitudinal axis of the spiral wound filtration element.

11. The spiral wound filtration element of claim 1, wherein a pressure drop of the fluid flow through the spiral wound filtration element is reduced by at least 10% compared to a same spiral wound filtration element having a feed spacer with strands having substantially identical thicknesses.

12. The spiral would filtration element of claim 1, wherein the at least one feed spacer includes from 0.1 to 10% by weight of ultra-high molecular weight polyethylene.

13. An extruded netting comprising:
a first set of parallel strands extending in a first direction and including a plurality of first strands having a first thickness and a plurality of second strands having a second thickness that is smaller than the first thickness; and
a second set of parallel strands extending in a second direction that is transverse to the first direction and including a plurality of third strands having a third thickness and a plurality of fourth strands having a fourth thickness that is smaller than the third thickness;
wherein the first set of strands and the second set of strands are always located on the same side of each other; and
the first set of parallel strands comprises alternating the first and second strands, and the second set of parallel strands comprises alternating the third and fourth strands;
wherein the thickness of the netting is not uniform, such that the netting is thickest where the first and third strands intersect, thinnest where the second and fourth strands intersect, and having an intermediate thickness where the first and fourth strands intersect and an intermediate thickness where the third and second strands intersect that is the same as the intermediate thickness where the first and forth strands intersect.

14. The extruded netting of claim 13 further comprising from 0.1 to 10% by weight of ultra-high molecular weight polyethylene.

15. The extruded netting of claim 13, wherein the first strands and the third strands have thicknesses of 5 to 40 mils and the second strands and the fourth strands have thicknesses of 3 to 35 mils.

16. The extruded netting of claim 13, wherein the first strands and the third strands have thicknesses of 8 to 35 mils and the second strands and the fourth strands have thicknesses of 5 to 15 mils.

17. The extruded netting of claim 13, wherein the netting has a total thickness at an intersection of the first and second set of parallel strands of 25 to 50 mils.

18. The extruded netting of claim 13, wherein the first set of parallel strands intersects the second set of parallel strands at an angle of 65 to 110 degrees in a direction parallel to a longitudinal axis of a spiral wound filtration element.

19. A spiral wound filtration element comprising:
a central collection tube having at least one hole defined therein;
at least one membrane envelope attached to the central collection tube and having two membrane sheets separated by a spacer, the at least one membrane envelope configured to be wrapped around the central collection tube to form a spiral; and
at least one feed spacer disposed adjacent to at least one membrane sheet of the two membrane sheets when wrapped around the central collection tube and to create a channel to receive liquid to be filtered, the at least one feed spacer comprising a netting including:
a first set of parallel strands extending in a first direction and including a plurality of first strands having a first thickness and a plurality of second strands having a second thickness that is smaller than the first thickness; and
a second set of parallel strands extending in a second direction that is transverse to the first direction and including a plurality of third strands having a third thickness and a plurality of fourth strands having a fourth thickness that is smaller than the third thickness;
wherein the first set of parallel strands and the second set of parallel strands form opposite faces of the at least one feed spacer; and
wherein the thickness of the at least one feed spacer is not uniform, such that the at least one feed spacer is thickest where the first and third strands intersect, thinnest where the second and fourth strands intersect, and having an intermediate thickness where the first and fourth strands intersect and an intermediate thickness where the third and second strands intersect that is the same as the intermediate thickness where the first and forth strands intersect.

20. A spiral wound filtration element comprising:
a central collection tube having at least one hole defined therein;
at least one membrane envelope attached to the central collection tube and having two membrane sheets separated by a spacer, the at least one membrane envelope configured to be wrapped around the central collection tube to form a spiral; and
at least one feed spacer configured to be disposed adjacent to at least one membrane sheet of the two membrane sheets when wrapped around the central collection tube and to create a channel to receive liquid to be filtered, the at least one feed spacer being capable of having a substantially planar shape which is rolled into a spiral orientation when inside the spiral wound filtration element, the at least one feed spacer comprising a netting including:
a first set of parallel strands extending in a first direction and including a plurality of first strands having a first thickness and a plurality of second strands having a second thickness that is smaller than the first thickness and
a second set of parallel strands extending in a second direction that is transverse to the first set of parallel strands, and including a plurality of third strands having a third thickness and a plurality of fourth strands having a fourth thickness that is smaller than the third thickness;
wherein the first and third strands are fused to one another at fused areas at intervals along the at least one feed spacer, and the second and fourth strands are fused to one another at fused areas at intervals alternating diagonally with the first and third strands.

21. The spiral wound filtration element of claim 20, wherein the second and third strands are fused to one another at fused areas spaced at intervals and the first and fourth strands are fused to one another at fused areas spaced at intervals.

22. The spiral wound filtration element of claim 21, wherein the fused areas of the first and third strands; the fused areas of the second and fourth strands; and the fused areas of the first and fourth strands are all co-planar when the at least one feed spacer is unrolled.

23. The spiral wound filtration element of claim 20, wherein the first strands, second strands, third strands, and fourth strands are substantially linear in shape when the at least one feed spacer is unrolled;
   wherein at least one of the two membrane sheets forming the at least one membrane envelope make contact with the at least one feed spacer primarily along the first strands; and a second membrane sheet of the two membrane sheets makes contact with at least one feed spacer primarily along the third strands;
   wherein nodes where the first set of parallel strands and the second set of parallel strands of the at least one feed spacer meet have a first thickness which is less than or equal to the combined thickness of the first and third strands; and a second thickness equal to the combined thickness of the second and fourth strands.

24. The spiral wound filtration element of claim 20, wherein the first, second, third, and fourth strands are coextruded.

25. The spiral wound filtration element of claim 24, wherein the maximum thickness of the at least one feed spacer is less than or equal to the thickness of the first and third strands.

26. The spiral wound filtration element of claim 25, wherein the maximum thickness of the at least one feed spacer is twice the thickness of the first strands; and wherein the maximum thickness of the at least one feed spacer is approximately twice the thickness of the third strands.

27. The spiral wound filtration element of claim 20, wherein the highest surface on a first face of the at least one feed spacer is defined by the first strands; and the lowest surface on a second face of the at least one feed spacer is defined by the third strands.

28. The spiral wound filtration element of claim 1,
   the first strands having a first edge that is substantially even with the top of the at least one feed spacer when the at least one feed spacer is unrolled, but an opposite edge that is not substantially even with the bottom of the at least one feed spacer when the at least one feed spacer is unrolled; the third strands having a first edge that is substantially even with the bottom of the at least one feed spacer when the at least one feed spacer is unrolled, but an opposite edge that is not substantially even with the top of the at least one feed spacer when the at least one feed spacer is unrolled.

* * * * *